(12) United States Patent
Evans et al.

(10) Patent No.: US 7,779,249 B2
(45) Date of Patent: Aug. 17, 2010

(54) SECURE TRANSMISSION OF DIGITAL CONTENT BETWEEN A HOST AND A PERIPHERAL BY WAY OF A DIGITAL RIGHTS MANAGEMENT (DRM) SYSTEM

(75) Inventors: Brian Evans, Redmond, WA (US); Ajitesh Kishore, Kirkland, WA (US); M. Jay Parks, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/332,113

(22) Filed: Dec. 10, 2008

(65) Prior Publication Data
US 2009/0125988 A1     May 14, 2009

Related U.S. Application Data

(60) Division of application No. 10/293,466, filed on Nov. 13, 2002, now Pat. No. 7,472,270, which is a continuation-in-part of application No. 10/123,479, filed on Apr. 16, 2002, now Pat. No. 7,272,858.

(51) Int. Cl.
*H04L 9/00* (2006.01)
(52) U.S. Cl. .................. 713/155; 713/150; 380/229; 705/67; 709/225
(58) Field of Classification Search .............. 713/150, 713/155; 380/229; 705/67; 709/225
See application file for complete search history.

(56) References Cited

U.S. PATENT DOCUMENTS

| | | | |
|---|---|---|---|
| 5,604,801 A | 2/1997 | Dolan et al. | |
| 5,715,403 A | 2/1998 | Stefik | |
| 6,069,647 A | 5/2000 | Sullivan et al. | |
| 6,088,802 A * | 7/2000 | Bialick et al. | 726/3 |
| 7,231,517 B1 * | 6/2007 | Mashayekhi | 713/167 |

(Continued)

FOREIGN PATENT DOCUMENTS

WO     WO 00/58811 A2     10/2000

(Continued)

OTHER PUBLICATIONS

Schneier, Bruce, Applied Cryptography, 1996, John Wiley & Sons Inc., Second Edition, pp. 48-49.*

(Continued)

*Primary Examiner*—Christian LaForgia
*Assistant Examiner*—Roderick Tolentino
(74) *Attorney, Agent, or Firm*—Woodcock Washburn LLP (57) ABSTRACT

A host securely transmits content to a peripheral thereof. The peripheral has a symmetric key (PK) and a copy of (PK) encrypted according to a public key (PU) of an entity ((PU (PK))). In the method, the host receives (PU(PK)) from the peripheral, and sends (PU(PK)) to the entity. The entity has a private key (PR) corresponding to (PU), applies (PR) to (PU (PK)) to obtain (PK), and sends (PK) back to the host. The host receives (PK) from the entity, encrypts at least a portion of the content according to (PK), and transmits the encrypted content to the peripheral. The peripheral may then decrypt the encrypted content based on (PK). A bind key (BK) encrypted by (PK) ((PK(BK))) may accompany (PU(PK)), where the content is to be encrypted according to (BK). Thus, (PK) is not revealed to the host.

16 Claims, 9 Drawing Sheets

U.S. PATENT DOCUMENTS

| | | | |
|---|---|---|---|
| 2002/0007456 | A1 | 1/2002 | Peinado et al. |
| 2002/0026583 | A1 | 2/2002 | Harrison et al. |
| 2002/0138442 | A1 | 9/2002 | Hori et al. |
| 2003/0118188 | A1* | 6/2003 | Collier et al. ............... 380/277 |

FOREIGN PATENT DOCUMENTS

| | | |
|---|---|---|
| WO | WO 00/59150 A2 | 10/2000 |
| WO | WO 01/52021 A1 | 7/2001 |

OTHER PUBLICATIONS

Griswold, G.N., "A Method for Protecting Copyright on Networks", *IMA Intell. Property Proceedings*, Jan. 1994, 1(1), 169-178.

Kahn, R.E., "Deposit, Registration, and Recordation in an Electronic Copyright Management System", *IMA Intellectual Project Proceedings*, Jan. 1994, 1(1), 111-120.

Hanaoka, G. et al., "A Hierarchical Non-Interactive Key-Sharing Scheme with Low Memory Size and High Resistance Against Collusion Attacks", *Computer Journal*, 2002, 45(3), 293-303.

Mizuki, T., "Sharing Unconditionally Secure Secret Keys", *Record of Electrical and Communication Engineering Conversazione Tohoku University*, Aug. 2000, 1-186.

Matsumoto, T. et al., "Crypto-Key Sharing Among Multiple Users", *IEEE Int'l Sym on Information Theory* (ISIT), Abstracts of Papers (Cat No. 86CH2374-7), Oct. 6-10, 1986, 103.

Schneier, B., *Applied Crpytography*, 1996, John Wiley & SOons, Inc, Second Edition 48-49.

Rifa-Coma, J., "How to Avoid the Cheaters Succeeding in the Key Sharing Scheme", *Designs, Codes and Cryptography*, Jul. 1993, 3(3), 221-228.

Weber, R., "Digital Rights Management Technology", Oct. 1995, 35 pages.

Woei-Jiunn Tsaur, et al., "Protocols for Designing a Fast and Perfect Group-Oriented Secret Key Sharing in Distributed Systems", *Proc. Second Int'l Symposium on Parallel Architectures, Algorithms, and Networks*, Jun. 12-14, 1996, Beijing China.

* cited by examiner

SECURE TRANSMISSION OF DIGITAL CONTENT BETWEEN A HOST AND A PERIPHERAL BY WAY OF A DIGITAL RIGHTS MANAGEMENT (DRM) SYSTEM

CROSS-REFERENCE TO RELATED APPLICATIONS

This application is a divisional of U.S. patent application Ser. No. 10/293,466, filed Nov. 13, 2002 and entitled "SECURE TRANSMISSION OF DIGITAL CONTENT BETWEEN A HOST AND A PERIPHERAL BY WAY OF A DIGITAL RIGHTS MANAGEMENT (DRM) SYSTEM," which application is a continuation in part of U.S. patent application Ser. No. 10/123,479, filed Apr. 16, 2002 and entitled "DIGITAL RIGHTS MANAGEMENT (DRM) ENCRYPTION AND DATA-PROTECTION FOR CONTENT ON A RELATIVELY SIMPLE DEVICE," the contents of all of which are hereby incorporated by reference in their entirety.

TECHNICAL FIELD

The present invention relates to an architecture for enforcing rights in digital content. More specifically, the present invention relates to such an enforcement architecture that allows access to encrypted digital content only in accordance with parameters specified by license rights acquired by a user of the digital content. Even more specifically, the present invention relates to an architecture that supports securely transmitting digital content between a host and a peripheral.

BACKGROUND

Figure 1:
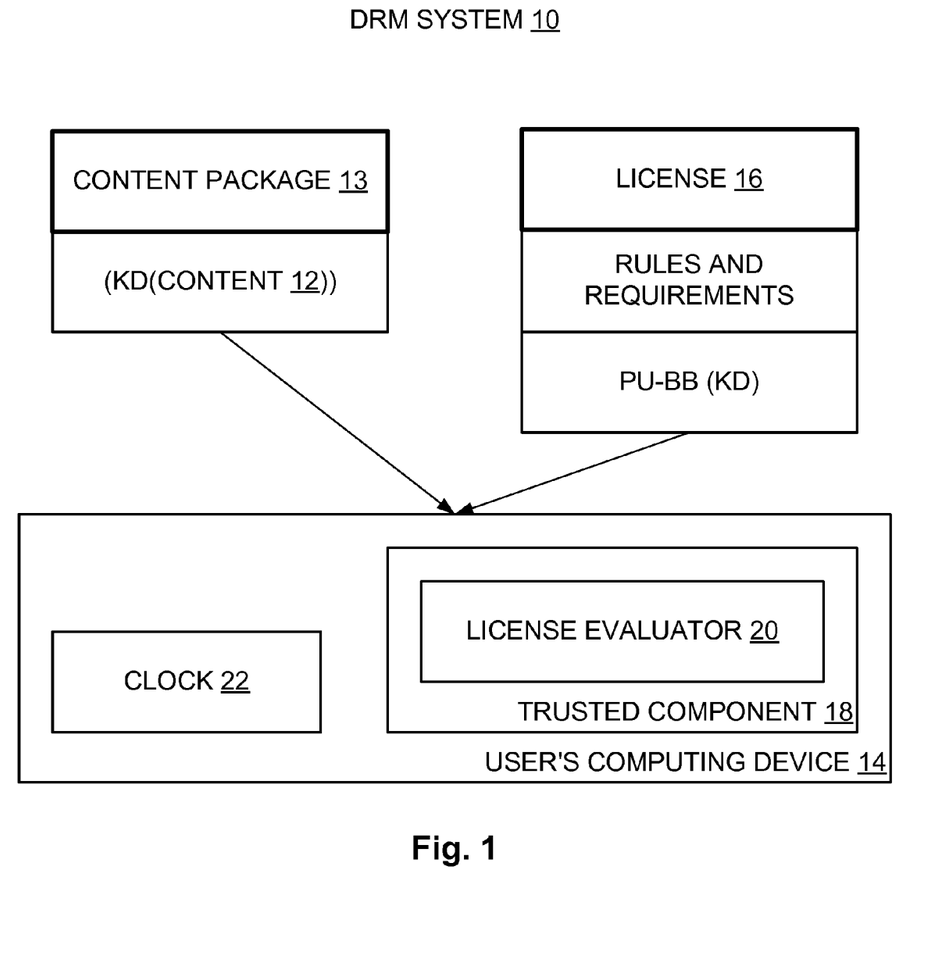
FIG. 1 is a block diagram showing an enforcement architecture of an example of a trust-based system.

As is known, and referring now to FIG. 1, digital rights management (DRM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14 or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A DRM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (PK), (i.e., (PK(CONTENT))), as well as other information identifying the content, how to acquire a license for such content, etc.

The trust-based DRM system 10 allows an owner of digital content 12 to specify license rules that must be satisfied before such digital content 12 is allowed to be rendered on a user's computing device 14. Such license rules can include the aforementioned temporal requirement, and may be embodied within a digital license 16 that the user/user's computing device 14 (hereinafter, such terms are interchangeable unless circumstances require otherwise) must obtain from the content owner or an agent thereof. Such license 16 also includes the decryption key (PK) for decrypting the digital content, perhaps encrypted according to a key decryptable by the user's computing device.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license 16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the DRM system 10 to carry out the wishes of the owner of the digital content 12 according to the rules and requirements in the license 16, and the user should not be able to easily alter such trusted element for any purpose, nefarious or otherwise.

As should be understood, the rules and requirements in the license 16 can specify whether the user has rights to render the digital content 12 based on any of several factors, including who the user is, where the user is located, what type of computing device the user is using, what rendering application is calling the DRM system, the date, the time, etc. In addition, the rules and requirements of the license 16 may limit the license 16 to a pre-determined number of plays, or pre-determined play time, for example.

The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 20 determining that the license 16 is valid and that the user satisfies the rules and requirements therein, the digital content 12 can then be rendered. In particular, to render the content 12, the decryption key (PK) is obtained from the license 12 and is applied to (PK(CONTENT)) from the content package 13 to result in the actual content 12, and the actual content 12 is then in fact rendered.

In a DRM system 10, content 12 is packaged for use by a user by encrypting such content 12 and associating a license 16 having a set of rules with the content 12, whereby the content 12 can be rendered only in accordance with the rules in the license 16. Because the content 12 requires the license 16 for access thereto, then, the content 12 may be freely distributed. Significantly, both the content 12 and the license 16 must be communicated to the computing device 14.

Once the computing device 14 decrypts the content 12 for rendering and in fact renders the content 12, the computing device oftentimes transmits the decrypted content 12 to a peripheral such as a printer, a display, speakers, etc. for actual rendering. Notably, such decrypted content 12 during such transmission is prone to attack by a nefarious entity seeking to copy the decrypted content.

Accordingly, a need exists for a method and mechanism for securing the transmission of the decrypted content 12 from a host such as the computing device 14 to a peripheral thereof. In particular, a need exists for an extension of the DRM system 10 to secure the transmission of the content 12.

SUMMARY

The aforementioned needs are satisfied at least in part by a method for the host to securely transmit content to a peripheral thereof. The peripheral has a symmetric key (PK) and a copy of (PK) encrypted according to a public key (PU) of an entity ((PU(PK))). In the method, the host receives (PU(PK)) from the peripheral, and sends (PU(PK)) to the entity. The entity has a private key (PR) corresponding to (PU), applies (PR) to (PU(PK)) to obtain (PK), and sends (PK) back to the host. The host receives (PK) from the entity, encrypts at least a portion of the content according to (PK), and transmits the encrypted content to the peripheral. The peripheral may then decrypt the encrypted content based on (PK).

In a variation on the above, the peripheral securely transmits content to the host. Here, the host upon receiving (PK) from the entity selects a content key (CK) for the content, encrypts (CK) according to (PK) to result in (PK(CK)), places (PK(CK)) in a digital license, and transmits the license including (PK(CK)) to the peripheral. The peripheral may then apply (PK) to (PK(CK)) to obtain (CK), encrypt at least a portion of the content according to (CK), and transmit the encrypted content to the host. Thereafter, the host applies (CK) to the encrypted content to decrypt same.

In either variation, a bind key (BK) encrypted by (PK) ((PK(BK))) may accompany (PU(PK)), where the content is to be encrypted according to (BK). Thus, (PK) is not revealed to the host.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF ILLUSTRATIVE EMBODIMENTS

Computer Environment

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
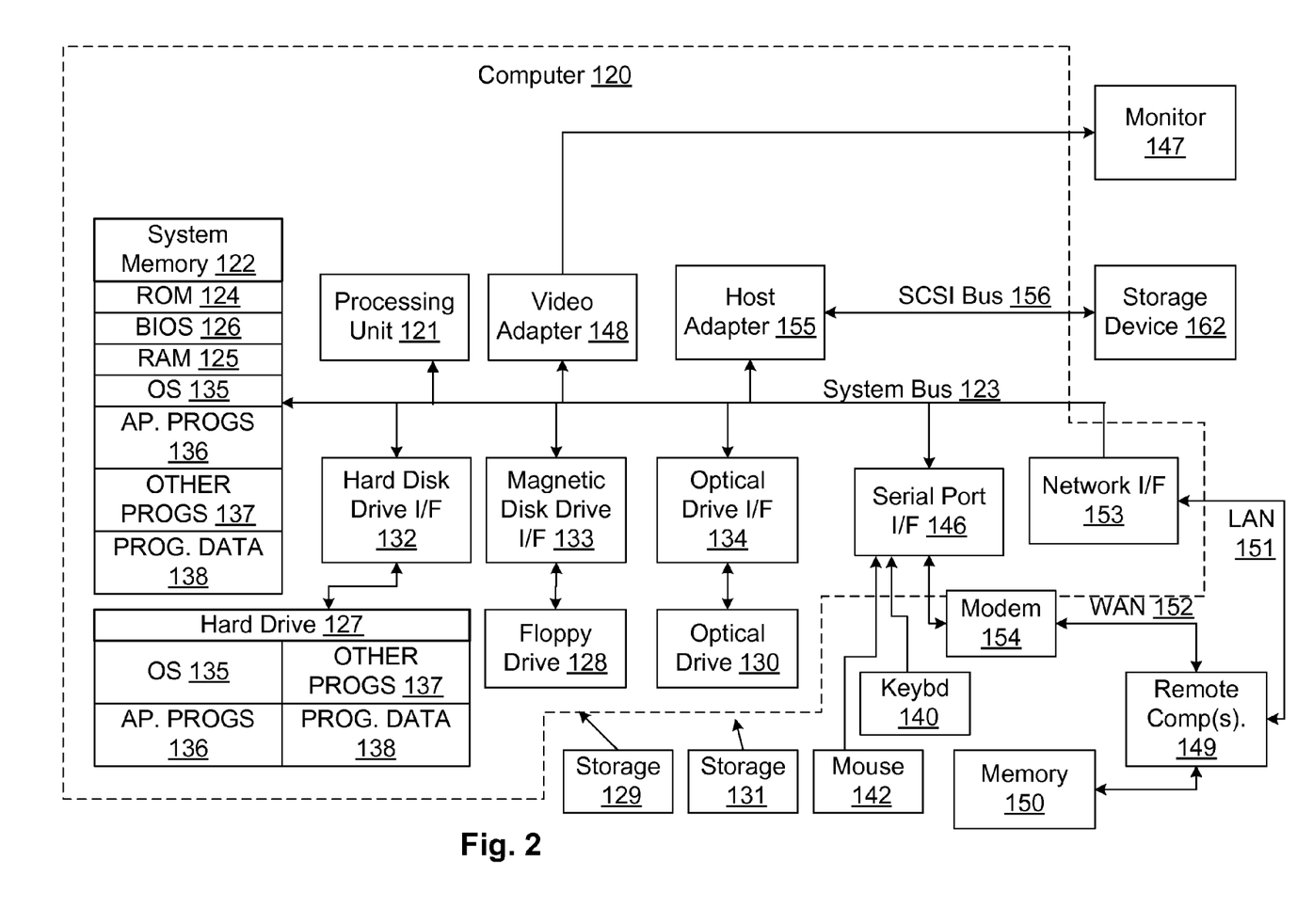
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Secure Digital Content Transmission from Host to Peripheral

Figure 3:
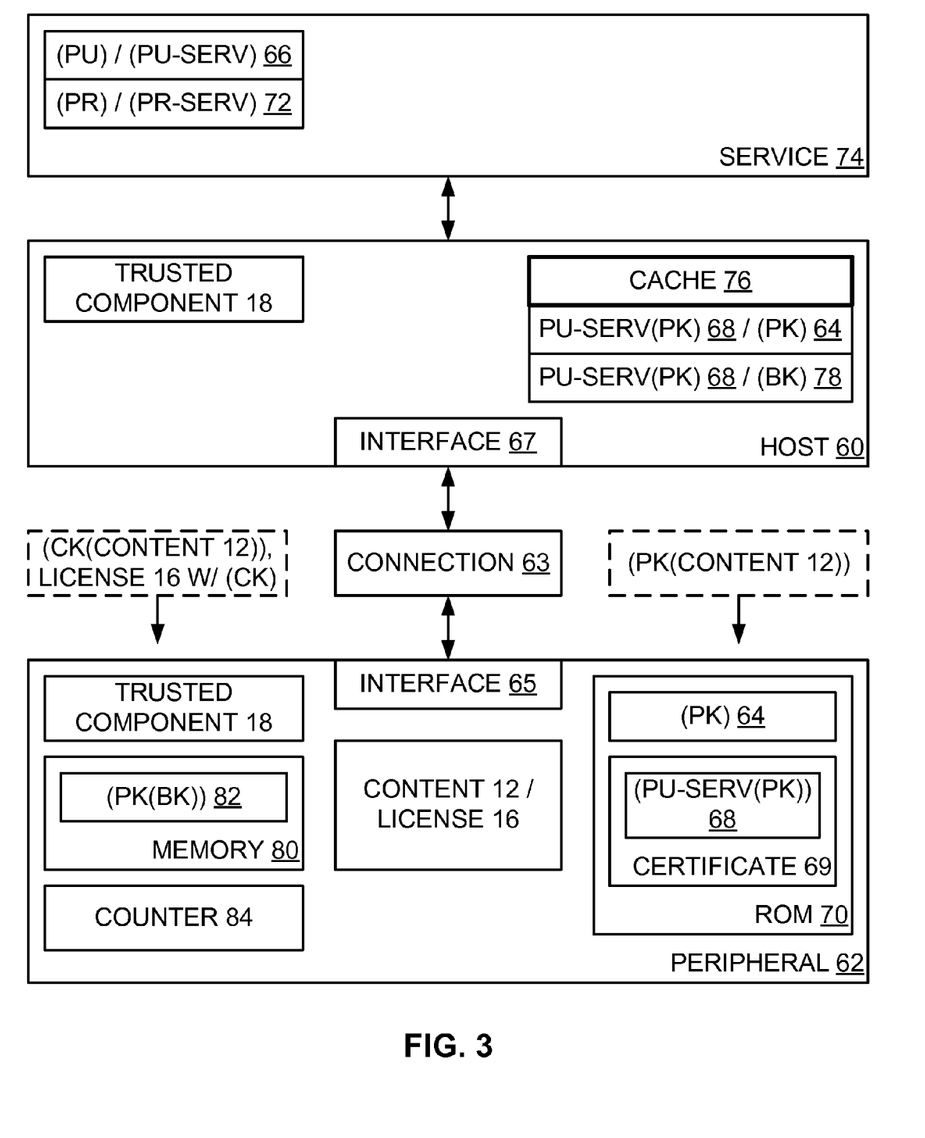
FIG. 3 is a block diagram showing a peripheral, a host, and a service for providing a symmetric key to the host for encrypting content for the peripheral in accordance with embodiments of the present invention.

In the present invention, and referring now to FIG. 3, the DRM system 10 as set forth above is extended to allow for the secure transmission of digital content 12 from a host 60 to a peripheral 62. Typically, the host 60 is a computing device 14 or the like, but may also be any other type of entity that transmits decrypted content 12 to a peripheral 62 for actual rendering thereon without departing from the spirit and scope of the present invention.

The peripheral 62 may be any rendering peripheral without departing from the spirit and scope of the present invention. For example, the peripheral 62 may be a display for displaying a video signal as transmitted from the host 60, a speaker system for creating sounds from an audio signal as transmitted from the host 60, a printer for printing based on a printing signal as transmitted from the host 60, etc.

In one embodiment of the present invention, and still referring to FIG. 3, content 12 at the host 60 to be rendered by the peripheral 62 is encrypted by the host 60 according to a symmetric content key (CK) to form (CK(content)), and the host 60 constructs a license 16 corresponding to (CK(content)), where the license 16 includes (CK) encrypted according to a form decryptable by the peripheral 62. The license 16 may also specify the limitations, if any, that must be satisfied by the peripheral 62 to render the corresponding content 12. Thereafter, (CK(content)) and the corresponding license 16 are transmitted from the host 60 to the peripheral 62.

In constructing the license 16, the host 60 ties or binds the license 16 and therefore the content 12 to the peripheral 62. In particular, the host 60 encrypts the content key (CK) for decrypting the content 12 according to a key that is decryptable by the peripheral 62.

Note that the DRM system 10 as specified above utilizes a mixture of encryption/decryption technologies, including both public key-private key (asymmetric) decryption and symmetric decryption. To review, symmetric encryption/decryption uses the same key for encryption and decryption and is typically fast and efficient. Asymmetric key encryption and decryption, however, uses two keys: a public key which may be released openly, and a private key which is retained as a secret. Typically either asymmetric key may be used to encrypt; the other key will then decrypt. By its nature, and as would be appreciated by the relevant public, asymmetric encryption and decryption typically requires much larger software, processing capacity, and memory, and is significantly slower. In practice, asymmetric keys are used to transfer data between un-trusted systems, such as for example a symmetric key. Once the symmetric key has been securely transferred, such symmetric key may then be used to encrypt and decrypt the bulk of content 12 to be protected.

However, and importantly, it may be the case that the asymmetric decryption is inappropriate for use with the peripheral 62, especially if relatively simple. More particularly, asymmetric decryption uses many more resources than symmetric decryption, including processor time and memory, to the point where a peripheral 62 if relatively simple cannot efficiently perform such asymmetric decryption. As may be appreciated, such a simple peripheral 62 likely is not fast enough and/or does not have enough memory available to perform such asymmetric decryption, but likely does have enough speed and memory to perform the simpler symmetric decryption.

Accordingly, to accommodate such a simple peripheral 62, and in one embodiment of the present invention, the peripheral 62 performs symmetric decryption only by way of a trusted component 18 (FIG. 3) instantiated in a memory thereon, and the host 60 performs any asymmetric cryptographic functions necessary.

In particular, the host 60 encrypts the content key (CK) according to symmetric key (PK) of the peripheral 62 to result in (PK(CK)). Thus, and as should be appreciated, the content key (CK) is obtainable by the peripheral 62 at the appropriate time by application of (PK) by the peripheral 62 to (PK(CK)), and the license 16 is therefore tied or bound to the peripheral 62.

Referring still to FIG. 3, to transmit (CK(content)) and the corresponding license 16 to the peripheral 62, the peripheral 62 must be coupled to the host 60 by way of a connection 63 which may be any appropriate connection without departing from the spirit and scope of the present invention. Typically, though, the portable device 62 has one or more interfaces 65 and such interface(s) 65 dictate the types of connections 63 that may be employed. For example, the interface 65 may be a serial port, a parallel port, a USB port, a 'fire wire' port, an infrared port, or the like, in which case a corresponding type of connection 63 must be employed, assuming the host 60 supports such connection 63 by way of a corresponding interface 67 and appropriate supporting hardware and/or software. Such connections 63, interfaces 65, 67, and hardware and/or software in support thereof are known or should be apparent to members of the relevant public and therefore need not be described herein in any further detail.

Notably, the peripheral 62 may be deemed particularly trustworthy based on its simplicity. That is, the peripheral 62 may have limited functionality and accessibility and therefore may be particularly invulnerable to attacks by a content thief or other nefarious individual. Accordingly, and in such a situation, the license 16 is not strictly necessary. Instead, the content 12 may be transmitted to the peripheral 62 encrypted according to the symmetric key (PK) of the peripheral 62 to form (PK(content)), and the peripheral 62 may render (PK(content)) at will.

As stated above, in one embodiment of the present invention, the peripheral 62 performs symmetric decryption only and does not therefore perform any asymmetric decryption. Accordingly, the peripheral 62 need only have enough memory, processing speed, and the like to perform symmetric decryption. Bearing in mind, however, that asymmetric encryption and decryption is still needed to transport (PK) from the peripheral 62 to the host 60, such asymmetric decryption is performed for the peripheral 62 at a location remote therefrom.

In particular, and still referring to FIG. 3, in one embodiment of the present invention, the peripheral 62 is provided with a symmetric device key (PK) 64, and is also provided with a copy of (PK) 64 encrypted according to a public key (PU) 66 (i.e., (PU(PK)) 68) so that the peripheral 62 may securely communicate (PK) 64 to the host 60. Note that communicating (PU(PK)) 68 to the host 60 may be performed only after advanced identification of such host 60, with the option of refusal or revocation by the peripheral 62 should it be found that the host 60 violates some standard of security or business usage.

In one embodiment of the present invention, (PK) 64 and (PU(PK)) 68 are permanently associated with the peripheral 62 by being permanently stored in a read-only memory (ROM) 70 on the peripheral 62 during manufacture thereof. Accordingly, each peripheral 62 may have a unique or nearly unique (PK) 64 and (PU(PK)) 68 in the ROM 70 thereon. Moreover, the peripheral 62 may tightly control external access to such ROM 70, thereby preventing a nefarious entity from obtaining such (PK) 64 and (PU(PK)) 68 from the peripheral 62.

Notably, if (PU(PK)) 68 is permanently associated with the peripheral 62, a corresponding private key (PR) 72 must be available somewhere to allow the host 60 to obtain (PK) 64 from such (PU(PK)) 68. A logical place for (PR) 72 would of course be the host 60, especially inasmuch as such host 60 needs to obtain (PK) 64. However, and importantly, the owner of (PU) 66 and (PR) 72 is most likely not the host 60, and therefore it is very unlikely that such owner would provide (PR) 72 to the host 60.

Accordingly, in one embodiment of the present invention, and still referring to FIG. 3, an accessible service 74 run by a trusted third party is employed as the owner of (PU) 66 and (PR) 72 (i.e., (PU-SERV) 66 and (PR-SERV) 72), and the host 60 employs such service 74 to obtain (PK) 64 from (PU-SERV(PK)) 68. As may be appreciated, such service 74 should be accessible to the host 60 by way of a network such as the Internet or an Intranet or the like. Such service 74 may be any appropriate service without departing from the spirit and scope of the present invention, and may for example comprise an appropriate server or computer run by the trusted third party.

Figure 4:
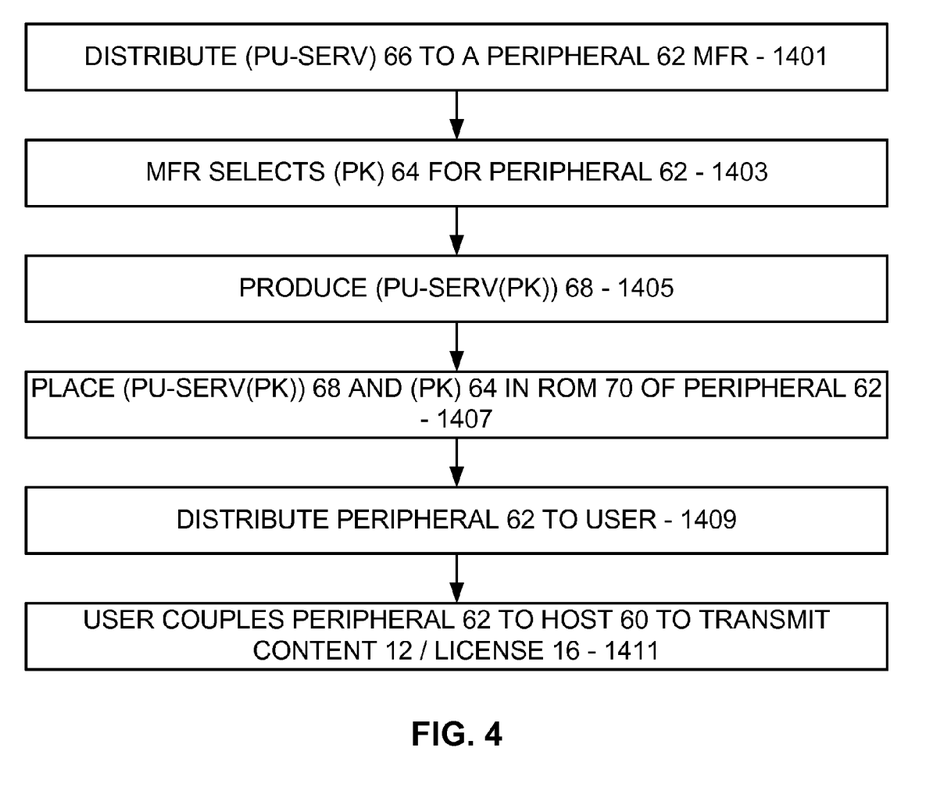
FIG. 4 is a flow diagram showing key steps performed in the manufacturing of the peripheral of FIG. 3 and the coupling of the peripheral to the host of FIG. 3 in accordance with a first embodiment of the present invention.

In one embodiment of the present invention, and referring now to FIG. 4, the public key of the service (PU-SERV) 66 is distributed to a manufacturer of a peripheral 62 (step 1401). The manufacturer then selects a symmetric device key (PK) 64 for the peripheral 62 (step 1403), encrypts (PK) 64 according to (PU-SERV) 66 to produce (PU-SERV(PK)) 68 (step 1405), and permanently places such (PU-SERV(PK)) 68 and (PK) 64 in the ROM 70 of the peripheral 62 (step 1407). The peripheral 62 is then distributed to a user (step 1409) and the user couples the peripheral 62 to a host 60 (step 1411) to transmit content 12 and (if necessary) a corresponding license 16.

As set forth above, the host 60 prior to transmitting must encrypt at least one of the content 12 or a content key (CK) according to a symmetric key (PK) of the peripheral 62. In one embodiment of the present invention, then, and referring now to FIG. 5, the peripheral 62 sends (PU-SERV(PK)) 68 to the host 60 (step 1501). Assuming for the moment that the host 60 has never seen such (PU-SERV(PK)) 68 before, such host 60 must get the service 74 to obtain (PK) 64 from such (PU-SERV(PK)) 68.

Figure 5:
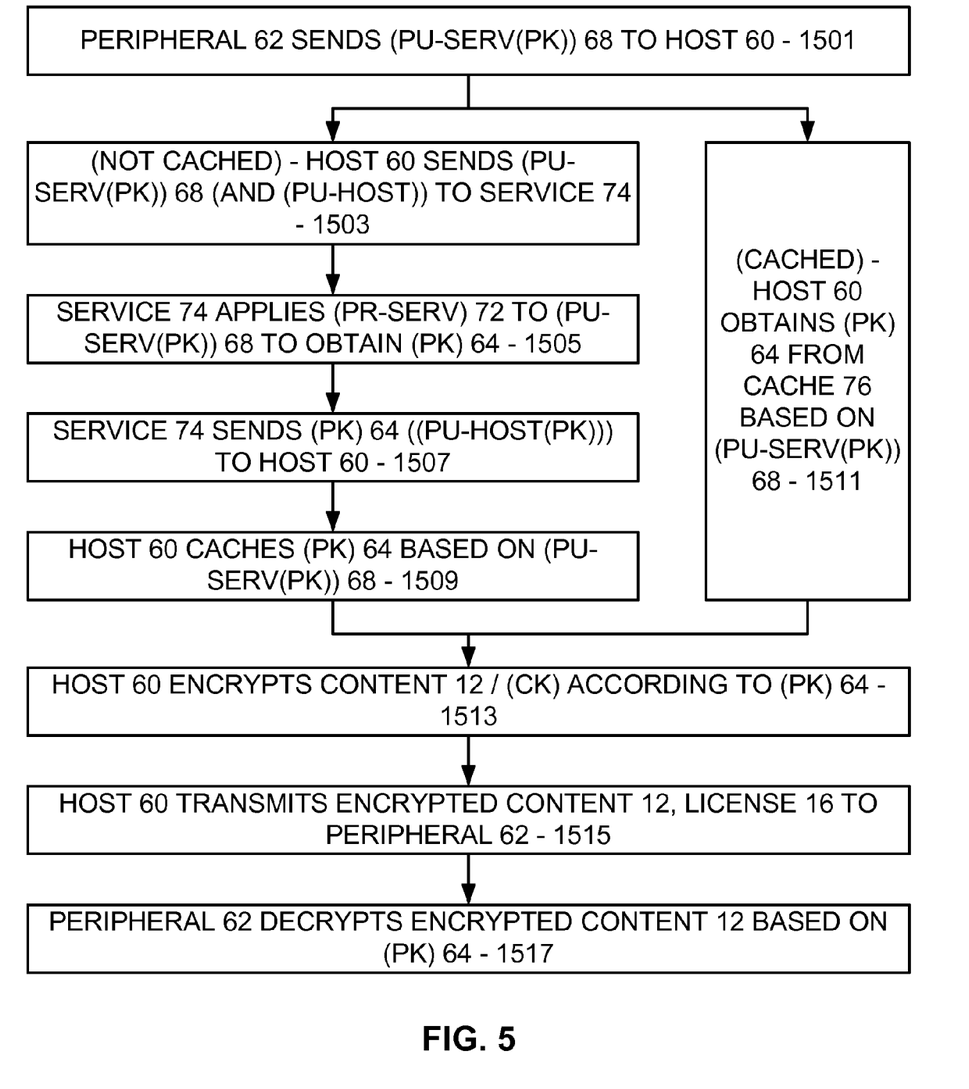
FIG. 5 is a flow diagram showing key steps performed in exchanging keys and content between the peripheral of FIG. 4 and the host and service of FIG. 3 in accordance with the first embodiment of the present invention.

Accordingly, the host 60 sends (PU-SERV(PK)) 68 to the service 74 (step 1503), the service 74 applies (PR-SERV) 72 to (PU-SERV(PK)) 68 to obtain (PK) 64 (step 1505), and the service 74 then sends such (PK) 64 back to the host 60 (step 1507). Bearing in mind that (PK) 64 should be transmitted in an encrypted form, step 1503 may also include the host 60 sending a public key thereof to the service 74, and step 1507 may include the service 74 sending such (PK) 64 back to the host 60 encrypted according to the public key of the host 60. In such case, the host 60 applies a private key thereof to obtain (PK) 64.

The host 60, now having (PK) 64, may choose to cache such (PK) 64 for later use so that repeat queries to the service 74 based on (PU-SERV(PK)) 68 are unnecessary (step 1509). Accordingly, the host 60 stores (PK) 64 according to (PU-SERV(PK)) 68 in a cache 76 (FIG. 3) in an appropriate location of the host 60, such as for example a state store of the trusted component 18 of such host 60. Thus, at a later time when the peripheral 62 sends (PU-SERV(PK)) 68 to the host 60, as at step 1501, the host 60 having seen such (PU-SERV(PK)) 68 before merely obtains (PK) 64 from the cache 76 based on such (PU-SERV(PK)) 68 (step 1511).

With (PK) 64 as obtained from the service 74 or the cache 76, the host 60 may then encrypt at least one of the content 12 or the content key (CK) as necessary according to (PK) 64 (step 1513), and transmit the encrypted content 12 alone or the encrypted content 12 and the corresponding license 16 with (PK(CK)) to the peripheral 62 (step 1515). The peripheral 62 may then decrypt the encrypted content based on (PK) 64 as necessary either directly or indirectly (by first applying (PK) to (PK(CK)) to result in (CK) and then applying (CK) to (CK(content))) (step 1517).

Note that in the course of sending information between the peripheral 62, the host 60, and the service 74 as set forth above, other information may also be sent to for example identify the sender. Such other information may include but is not limited to a certificate or other guarantee to demonstrate the sender's qualifications, a payment, and the like.

Note, too, that the peripheral 62 may send (PU-SERV(PK)) 68 in the form of a certificate 69 (FIG. 3). Such certificate 69 could among other things authenticate device and certificate data by virtue of the signature on the certificate 69, identify device type, manufacturer, model, etc., and/or describe device capabilities including DRM-related capabilities such as whether the peripheral 62 contains a secure clock, can accept secure state information, can accept external licenses 16, etc. The certificate 69 may also be necessary to identify the manufacturer of the peripheral 62 to the host 60 so that the host 60 may access appropriate device drivers, among other things. Additionally, and significantly, the host 60 may decide whether to trust the peripheral 62 based at least in part on the manufacturer thereof and other information as contained in the certificate 69.

In the present invention, the content 12 as encrypted by the host 60 and securely transmitted to the peripheral 62 may in fact comprise several individual pieces of content 12 transmitted over a period of time, where the corresponding license 16 allows the peripheral 62 to render all of the individual pieces of content 12. For example, the host 60 may encrypt all content 12 with the same (CK) and a single corresponding license 16 may contain such (CK) and allow rendering of all content 12 transmitted from the host 60 in perpetuity, or all content 12 transmitted in the next hour. Likewise, the host 60 may encrypt each individual piece of content 12 with a different (CK), and each individual piece of content 12 requires a separate corresponding license 16 with the different (CK).

The host 60 may encrypt the content 12 in some piece-wise fashion, such as for example by packet encryption. Thus, greater fault tolerance is provided. Such packet encryption is also advisable in the event that the content 12 is a data stream, such as for example a video feed to a display peripheral 62. More significantly, only selected ones of the packets of content 12 need be encrypted to provide good protection, with the result being that the un-encrypted packets of content 12 represent a significant savings in resources that the peripheral 62 must expend in rendering the content 12.

In the present embodiment as thus far disclosed, the host 60 and the peripheral 62 both possess (PK) 64. However, (PK) 64 should not be made available to any other entity. Accordingly, the content 12 protected by (PK) 64 cannot easily be stolen or otherwise intercepted from the peripheral 62. Nonetheless, it may be somewhat troubling that the host 60 possesses (PK) 64. In another embodiment of the present invention, then, (PK) 64 is a symmetric key but is kept private to the peripheral 62, and a symmetric binding key (BK) 78 (FIG. 3) is provided to the peripheral 62 to bind the peripheral 62 to the host 60.

In contrast with (PK) 64, (BK) 78 should be re-writable. Accordingly, in the event that (BK) 78 becomes compromised, and by extension the peripheral 62 becomes compromised, (BK) 78 may be changed, as will be set forth in more detail below. In one embodiment of the present invention, then (BK) 78 is re-writably located in a re-writable memory 80 on the peripheral 62, and is tied to (PK) 64 by being located in such memory 80 as (BK) 78 encrypted according to (PK) 64 (i.e., as (PK(BK)) 82). Notably, the peripheral 62 should tightly control external access to such memory 80, thereby preventing a nefarious individual from obtaining such (PK(BK)) 82 from the peripheral 62.

Figure 6:
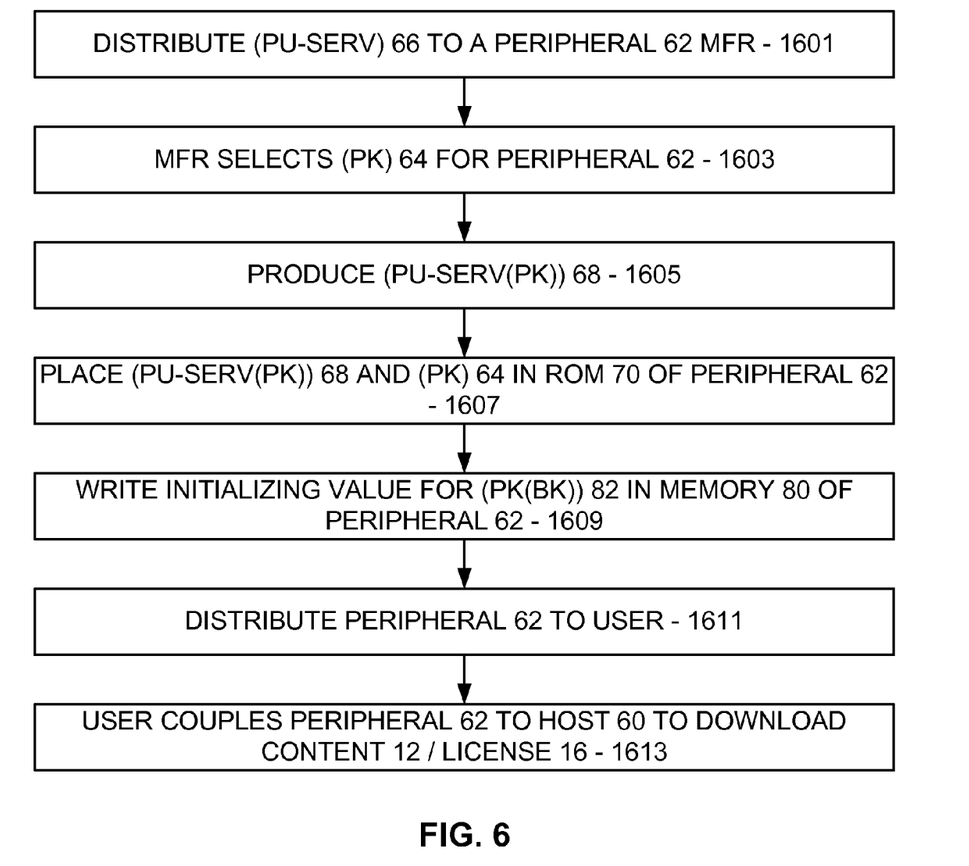
FIG. 6 is a flow diagram showing key steps performed in the manufacturing of the peripheral of FIG. 3 and the coupling of the peripheral to the host of FIG. 3 in accordance with a second embodiment of the present invention.

Referring now to FIG. 6, it is seen that as before, the public key of the service (PU-SERV) 66 is distributed to a manufacturer of a peripheral 62 (step 1601), and the manufacturer selects a symmetric device key (PK) 64 for the peripheral 62 (step 1603), encrypts (PK) 64 according to (PU-SERV) 66 to produce (PU-SERV(PK)) 68 (step 1605), and permanently places such (PU-SERV(PK)) 68 and (PK) 64 in the ROM 70 of the peripheral 62 (step 1607). In addition, the manufacturer creates the re-writable memory 80 in the peripheral 62 for (PK(BK)) 82 and writes an initializing value in such memory 80 (step 1609). The initializing value in one embodiment of the present invention is set to a pre-determined value (such as for example zero) that signals to the host 60 that such (BK) 78 needs to be initialized to a randomized value and thus be individualized to such peripheral 62, and then employed to store (PK(BK)) 82. The peripheral 62 with the initializing value is then distributed to a user (step 1611) and the user couples the peripheral 62 to a host 60 (step 1613) to transmit content 12 and (if necessary) a corresponding license 16.

In the present embodiment, and in contrast with the embodiment disclosed in connection with FIGS. 3 and 4, the host 60 prior to transmitting must encrypt at least one of the content 12 or the content key (CK) according to (BK) 78. To do so, and referring now to FIG. 7, the peripheral 62 sends both (PU-SERV(PK)) 68 and (PK(BK)) 82 to the host 60 (step 1701). Assuming for the moment that the host 60 finds (PK(BK)) 82 set to the pre-determined initializing value (such as for example zero), the host 60 recognizes that (BK) 78 and by extension (PK(BK)) 82 must be initialized for the peripheral 62.

Figure 7:
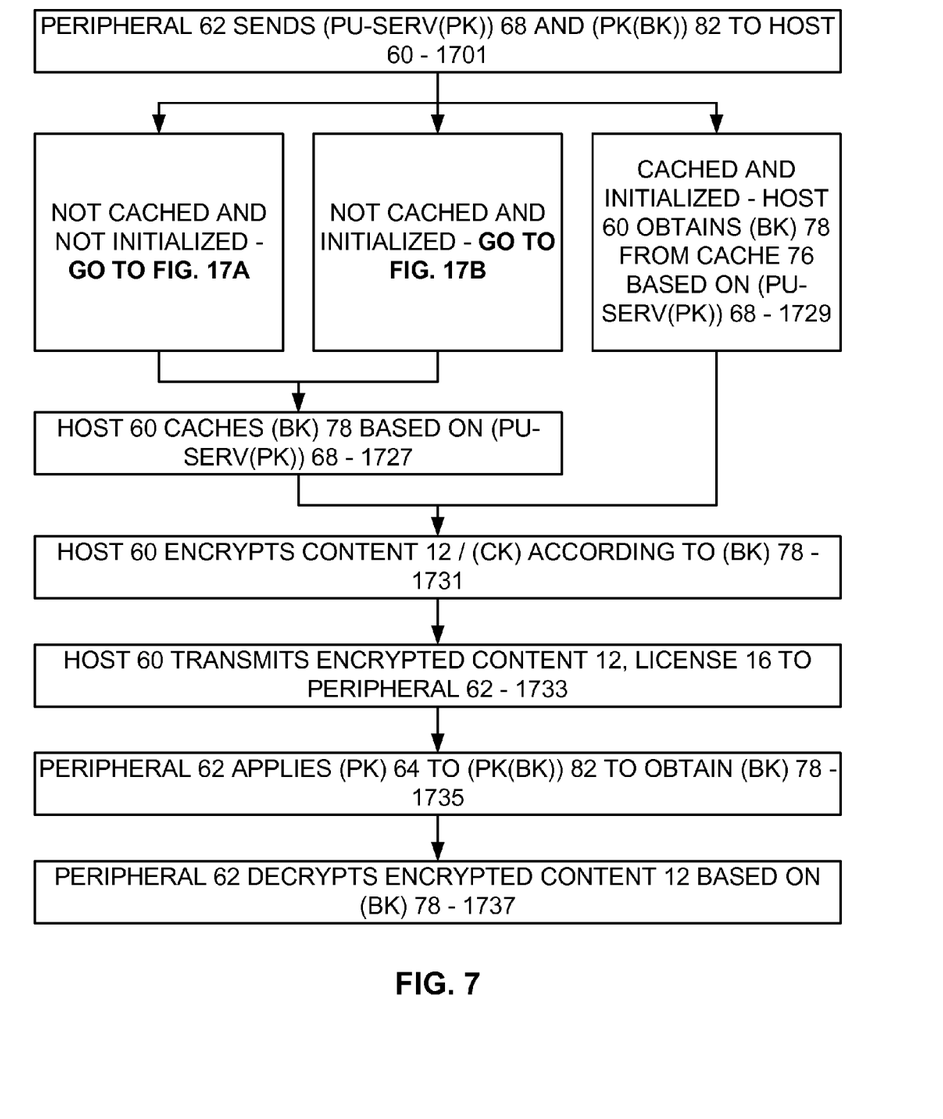
FIGS. 7, 7A, and 7B are flow diagrams showing key steps performed in exchanging keys and content between the peripheral of FIG. 6 and the host and service of FIG. 3 in accordance with the second embodiment of the present invention.
Figure 7A:
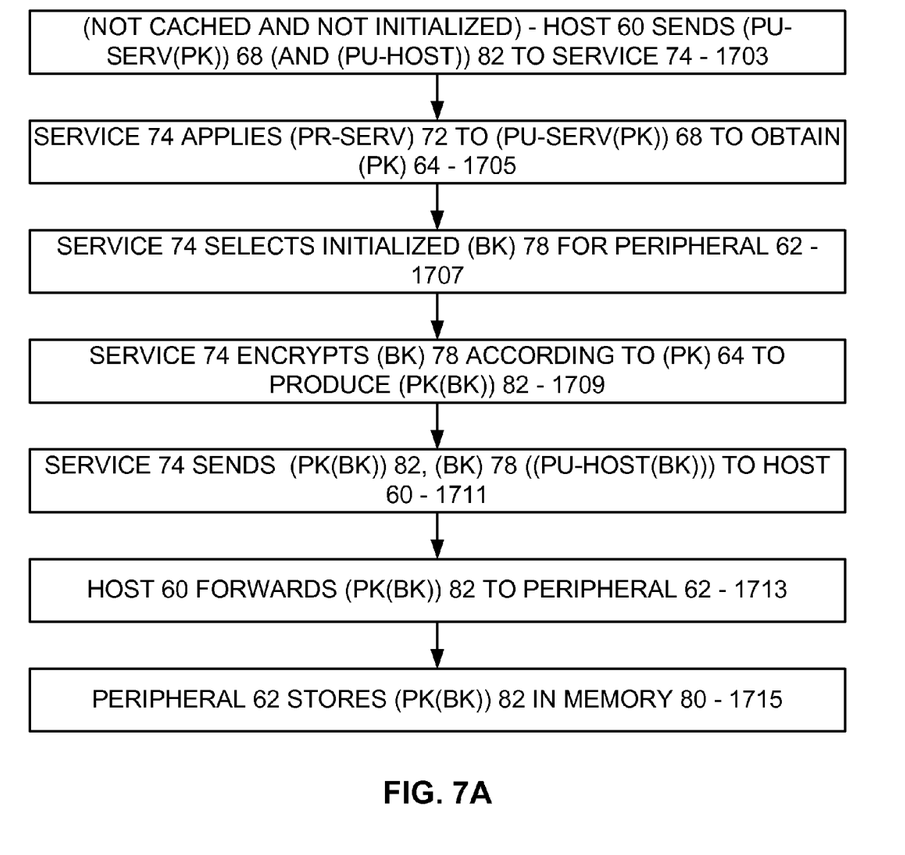

Accordingly, and as seen in FIG. 7A, the host 60 forwards (PU-SERV(PK)) 68 without any (PK(BK)) 82 to the service 74 (step 1703). As before, the service 74 applies (PR-SERV) 72 to (PU-SERV(PK)) 68 to obtain (PK) 64 (step 1705). However, since no (PK(BK)) 82 was sent, the service selects an initialized (BK) 78 for the peripheral 62 (step 1707), employs the obtained (PK) 64 to encrypt the initialized (BK) 78 to produce (PK(BK)) 82 (step 1709), and returns (PK(BK)) 82 and (BK) 78 to the host 60 (step 1711). Note that in an alternative embodiment, the host 60 may select (BK) 78 for the peripheral 62, and send same to the host 60. In either case, the host 60 forwards (PK(BK)) 82 to the peripheral 62 (step 1713), where same is stored in the re-writable memory 80 thereon (step 1715).

Figure 7B:
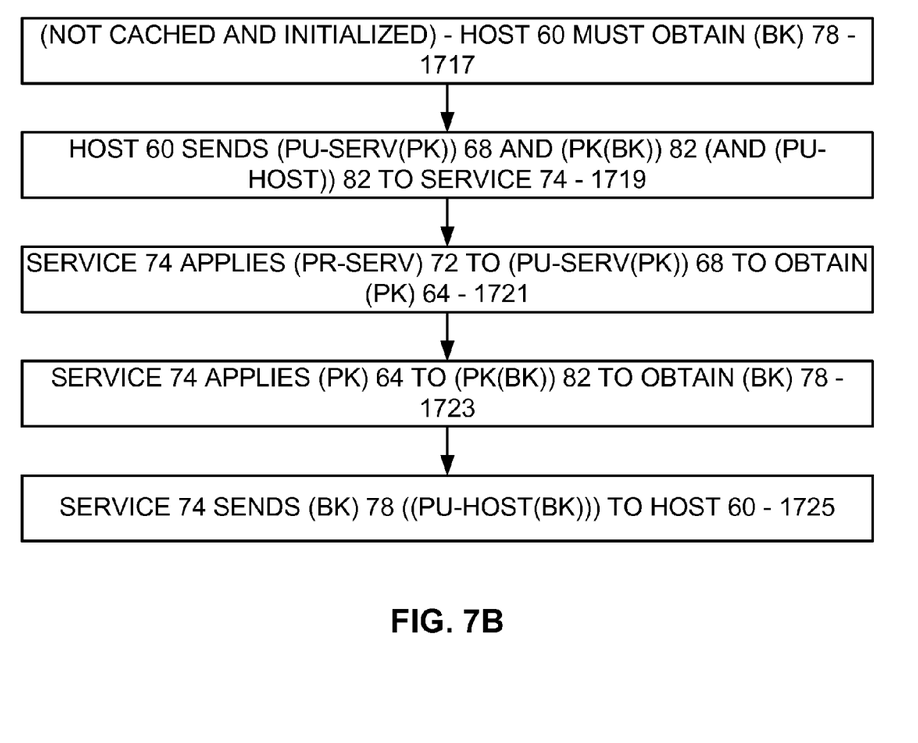

Still referring to FIG. 7, and assuming now that the host 60 receives both (PU-SERV(PK)) 68 and (PK(BK)) 82 from the peripheral 62 as at step 1701 and finds (PK(BK)) 82 set to a value other that the pre-determined initializing value, and assuming (BK) 78 is not cached thereon, the host 60 recognizes that (BK) 78 must be obtained (step 1717) (FIG. 7B). Accordingly, the host 60 sends (PU-SERV(PK)) 68 and (PK(BK)) 82 to the service 74 (step 1719), the service 74 applies (PR-SERV) 72 to (PU-SERV(PK)) 68 to obtain (PK) 64 (step 1721), applies (PK) 64 to (PK(BK)) 82 to obtain (BK) 78 (step 1723), and the service 74 then sends such (BK) 78 back to the host 60 (step 1725). As before, bearing in mind that (BK) 78 should be transmitted in an encrypted form, steps 1703 and 1719 may also include the host 60 sending a public key thereof to the service 74, and steps 1711 and 1725 may include the service 74 sending such (BK) 78 back to the host 60 encrypted according to the public key of the host 60. In such case, the host 60 applies a private key thereof to obtain (BK) 78.

In the present embodiment, the host 60 has (BK) 78 after step 1711 or after step 1725. In either case, the host 60 may choose to cache such (BK) 78 for later use so that repeat queries to the service 74 based on (PU-SERV(PK)) 68 are unnecessary. Accordingly, and as was set forth above, the host 60 stores (BK) 78 according to (PU-SERV(PK)) 68 in the cache 76 (FIG. 3) thereof (step 1727). Thus, at a later time when the peripheral 62 sends (PU-SERV(PK)) 68 to the host 60, as at step 1701, the host 60 having seen such (PU-SERV(PK)) 68 before merely obtains (BK) 78 from the cache 76 based on such (PU-SERV(PK)) 68 (step 1729). Note that (PK(BK)) 82 need not be employed as an additional index value in the cache 76 to obtain (BK) 78 therefrom, unless multiple ones of the peripheral 62 have the same (PK) 64, as discussed below.

With (BK) 78 as obtained from the service 74 or the cache 76, the host 60 may then encrypt at least one of the content 12 or the content key (CK) as necessary according to (BK) 78 (step 1731), and transmit the encrypted content 12 alone or the encrypted content 12 and the corresponding license 16 with (BK(CK)) to the peripheral 62 (step 1733). The peripheral 62 may then decrypt the encrypted content 12 as necessary by applying (PK) 64 to (PK(BK)) 82 to obtain (BK) 78 (step 1735), and then applying (BK) 78 to the encrypted content, either directly or indirectly (by first applying (BK) to (BK(CK)) to result in (CK) and then applying (CK) to (CK (content))) (step 1737).

Significantly, in all the steps performed in the present embodiment, the peripheral 62 and the service 74 never reveal (PK) 64 to the host 60. Instead, only the binding key (BK) 78 is so revealed. If (BK) 78 (i.e., (BK-1) 78) somehow becomes compromised, a new (BK-2) 78 may be obtained for the peripheral 62 in the manner set forth above. Further, if (BK-1) 78 is encrypted according to (BK-2) 78 to produce (BK-2 (BK-1)) and same is stored on the peripheral 62, such peripheral 62 may obtain (BK-1) as necessary to decrypt an older encrypted content by applying (PK) 64 to (PK(BK-2)) 82 to obtain (BK-2) 78, applying (BK-2) 78 to (BK-2(BK-1)) to obtain (BK-1) 78, and then applying (BK-1) 78 to the older encrypted content. Of course, such a 'daisy-chain' may be extended an indefinite number of times to give the peripheral 62 newer binding keys 78 (i.e., (BK-3), (BK-4), etc.) while still being able to handle older content encrypted according to older binding keys 78.

Also significantly, by employing a symmetric device key (PK) 64 in combination with a symmetric binding key (BK) 78 in the manner set forth above, multiple ones of the peripheral 62 may be mass-produced with the same (PK) 64. As may be appreciated, each peripheral 62 with the same (PK) 64 is individualized by having a different (BK) 78. Of course, in such a situation, (PK(BK)) 82 should be employed as an additional index value in the cache 76 to obtain (BK) 78 therefrom, in the unlikely event multiple peripherals 62 having the same (PK) 64 (and the same (PU-SERV(PK)) 68) visit the same host 60.

As thus far disclosed, in the present invention, a peripheral 62 delivers a secret (the key (PK)) to a host 60 thereof so that the host 60 may encrypt content 12 to be transmitted to the peripheral 62 according to the secret. In addition, the peripheral 62 may deliver the secret to the host 60 along with or in the form of a certificate 69. Thus, the transmittal of such encrypted content 12 from the host 60 to the peripheral 62 is secure from any nefarious entity that may otherwise attempt to steal the content 12 during such transmittal. In addition, the transmittal is trusted by the host 60 to be secure based on the encryption of the content 12 and based on accepting the peripheral to be trustworthy based on the certificate 69.

Notably, in addition to the transmittal of the content 12 from the host 60 to the peripheral 62 being secure based on the content 12 being encrypted according to the secret, any transmittal of data from the peripheral 62 to the host 60 may also be secured based on such data being encrypted by the peripheral 62 according to the same secret, especially inasmuch as the secret is shared between the host 60 and the peripheral 62. Put more generally, with the present invention, the host 60 and the peripheral 62 can bi-directionally communicate securely with one another based on the shared secret. Thus, in addition to the peripheral 62 being an output device such as a display or a speaker or a printer, the peripheral may also be an input device such as a mouse, a keyboard, a paper scanner, a retinal scanner, a fingerprint scanner, an environmental detector, and the like, and can take advantage of the shared secret to securely transmit data to the host 60. As a result, a nefarious entity cannot intercept the data, and also cannot substitute other data in an attempt to deceive the host 60.

As thus far disclosed, in the present invention, the peripheral 62 is presumed to be a relatively simple device that cannot efficiently perform asymmetric cryptography. However, and importantly, the peripheral 62 may also be a relatively sophisticated device that can in fact efficiently perform asymmetric cryptography without departing from the spirit and scope of the present invention. In such a situation, the host 60 need not perform any asymmetric cryptographic functions for the peripheral 62, and the host 60 encrypts the content key (CK) according to a public key (PU-P) of the peripheral 62 to result in (PU-P(CK)). Thus, and as should be appreciated, the content key (CK) is obtainable by the peripheral 62 at the appropriate time by application of a private key (PR-P) of the peripheral 62 corresponding to (PU-P) to (PU-P(CK)), and the license 16 is therefore tied or bound to the peripheral 62.

Significantly, (PU-P) as a public key need not be encrypted and can be delivered directly to the host 60 by the peripheral 62, typically in the certificate 69, without any need for the service 74. More generally, allowing the host 60 to directly authenticate and encrypt for a peripheral 62 without the service 74 permits the host 60 to operate with the peripheral 62 even if the host 60 is not network-connected.

In one embodiment of the present invention, the host 60 can periodically interrogate the peripheral 62 to ensure that the peripheral is still active, connected, functional, present, or the like. Here, the response from the peripheral 62 should at least include the certificate 69 for such peripheral 62. In addition, the response may include information on the license 16 from the host 60.

The license 16 corresponding to the encrypted content 12 as transmitted by the host 60 to the peripheral 62 may be any type of license 16 without departing from the spirit and scope of the present invention. For example, the license 16 may be rule-based and therefore specify a set of rules that the peripheral 62 is trusted to follow. Such rules may specify one or more conditions precedent to allowing rendering as well as specific types of rendering allowed, among other things. Note, however, that the license 16 should not specify rules that are beyond the ken of the peripheral 62, especially if the peripheral 62 is relatively simple.

Note, too that inasmuch as the transactions between the host 60 and the peripheral 62 are typically automated, the license 16 is typically selected from one or more of a limited number of available license templates, depending upon details regarding the content 12 and/or the peripheral 62. For example, a license 12 to be sent to a particular peripheral 62 may be constructed from only a single template that grants rendering rights in perpetuity, while a license 12 to be sent to another particular peripheral 62 may be constructed either from a template that grants rendering rights for a specific timer period, or from a template that grants rendering rights for a specific number of renderings. Examples of some types of license templates for use with regard to particular types of peripherals 62 are as follows.

Peripheral 62 has no clock or state—This situation is typical for a video display. The display electronics are as simple as possible and the display has no secure (trusted) clock or secure state. A nefarious entity capturing and replaying the content is not a particular concern, but copying to another device or medium is a concern. Therefore the license 16 need only set forth a relatively lower security stance.

One available solution is to periodically issue a new, single license 16 to the display. The display would signal receipt of the new license 16, perhaps by transmitting back values from the new license 16 signed by a secret key verifiable by the host 60, but not counterfeit-able by a nefarious entity that does not possess the secret key. The license 16 would apply to all protected content 16 until a new replacing license 16 is issued. This would be sufficient to prevent interception and copying of the transmitted content, with minimal implementation requirements. Replay (transmitting the same content again, hours or days later) would be made less likely through the periodic issuance of a new license 16. Such a license 16 is primarily useful where the peripheral 62 immediately decrypts and renders the content 12 with no caching or retention such that the content 12 is ephemeral or momentary to the peripheral 62, and where the communication channel is such that the host may frequently transmit new licenses 16.

The host 60 may also employ such a license 16 in connection with multi-casting or broad-casting the content 12 to multiple peripherals 62. Here, the content 12 is always decrypted by the same content key (CK). Each peripheral 62, however, has a different license 16 with such content key (CK) encrypted according to the peripheral key (PK) of such peripheral 62.

Note that the above mechanism allows content 12 to be securely bound to a peripheral 62, but does not protect against capturing the license 16 and the content 12 and then replaying ad infinitum the captured content 12 based on the captured license 16 on the peripheral 62. However, such an attack would be defeated by adding a counter 84 (FIG. 3) to the peripheral 62. The counter 84, preferably non-volatile and secure, would for example increment once for each license 16 received. The host 60 could then request the current count from the counter 84 at any point, and could incorporate the current count into a license 16 to the effect that the license 16 is not to be honored once the counter 84 changes.

Peripheral 62 caches content 12—This situation is typical for a printer, and particularly a relatively advanced printer which caches print jobs. In such a scenario, some jobs may even be retained for some time until the cache is overwritten, a printer malfunction is cleared, a user signals for the job to begin, etc. Here, the host 60 may create a unique license 16 for each piece of content 12 to be printed as a job. The printer peripheral 62 should optimally possess a secure state and a secure clock, and the license 16 would then allow for a limited number of copies (play count=1, 10, 20, etc.), and would possess an expiration time on the order of an hour, 12 hours, a day, or the like. To provide additional security, the license 16 could require partial decryption of the content 12 to a smaller buffer such that the entire decrypted content 12 would not be present at any one time.

Peripheral 62 is available to many hosts 60—This situation is typical in a network environment where, for example, any of several hosts can print to a network printer peripheral 62 or can display to a network display peripheral 62. Here, the concern is that the peripheral 62 only render content 12 from an authorized host 60. In such a case, each host 60 would provide in a license 16 therefrom an ID value to uniquely identify either the content 12 or the host 60 itself, and the corresponding content 12 would include such ID value and thus cross-reference to the license 16 based thereon. If no cross-referenced license 16 is available to the peripheral 62, such as for example from a store, the content 12 is not rendered by the peripheral 62. Hosts 60 would not need to cross-authenticate, and the peripheral could be configured to not render content 12 except in a protected form from an authorized host 60.

CONCLUSION

Although the present invention is especially useful in connection with a peripheral 62 such as was set forth above, the present invention may be practiced with regard to any appropriate device, be it relatively simple or relatively complex, all without departing from the spirit and scope of the present invention, such as for example a personal computer, a server, an intelligent appliance, etc. Accordingly, peripheral 62 is to be interpreted to encompass any device 62 that couples to and communicates with a host 60 or the like.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism that allows the DRM architecture 10 to be extended to a peripheral 62 by allowing for encryption and data-protection for content 12 transmitted to the peripheral 62, even if the cryptography capabilities of the peripheral 62 are limited. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed:

1. A method performed in combination with a host and a peripheral that couples to the host, the peripheral having a symmetric key (PK) and a copy of (PK) encrypted according to a public key (PU) of an entity ((PU(PK))), the method for the peripheral to securely transmit content to the host and comprising:

the host receiving (PU(PK)) from the peripheral, the host being a computing device communicatively coupled to the entity, the peripheral communicatively coupled to the host;

the host sending (PU(PK)) to the entity, the entity comprising a computing device having encryption keys for encrypting and decrypting data;

the entity, having a private key (PR) corresponding to (PU), applying (PR) to (PU(PK)) to obtain (PK), and sending (PK) back to the host;

the host receiving (PK) from the entity, selecting a content key (CK) for the content, encrypting (CK) according to (PK) to result in (PK(CK)), placing (PK(CK)) in a digital license, and transmitting the license including (PK(CK)) to the peripheral, the peripheral applying (PK) to (PK(CK)) to obtain (CK), encrypting at least a portion of the content according to (CK), and transmitting the encrypted content to the host; and the host receiving the encrypted content from the peripheral and applying (CK) to the encrypted content to decrypt same.

2. The method of claim 1 wherein the host has a public key (PU-H) and a private key (PR-H), the method comprising:

the host sending (PU(PK)) and (PU-H) to the entity, whereby the entity encrypts (PK) according to (PU-H) to result in (PU-H(PK)) and sends same back to the host; and the host receiving (PU-H(PK)) and applying (PR-H) thereto to obtain (PK).

3. The method of claim 1 further comprising the host caching (PK) for later use.

4. The method of claim 3 comprising:
the host storing (PK) according to (PU(PK)) in a cache of the host;
the host again receiving (PU(PK)) from the peripheral; and
the host recognizing based on (PU(PK)) that (PK) is stored in the cache and retrieving (PK) from the cache based on such (PU(PK)).

5. The method of claim 1 comprising the host placing (PK(CK)) and at least one specified limitation in the license, whereby the peripheral is trusted to determine that each limitation in the license is satisfied before encrypting the content.

6. The method of claim 1 comprising the host placing (PK(CK)) and at least one specified right in the license, whereby the peripheral is trusted to determine that at least one right in the license allows the peripheral to encrypt the content.

7. The method of claim 1 comprising the host receiving (PU(PK)) from the peripheral in the form of a digital certificate.

8. The method of claim 7 comprising the host receiving (PU(PK)) from the peripheral in the form of a digital certificate that identifies with regard to the peripheral at least one of a type thereof, a manufacturer thereof, a model thereof, and capabilities thereof.

9. A method performed in combination with a host and a peripheral that couples to the host, the peripheral having a symmetric peripheral key (PK), a copy of (PK) encrypted according to a public key (PU) of an entity ((PU(PK))), and a symmetric binding key (BK) encrypted according to (PK) ((PK(BK))), the method for the peripheral to securely transmit content to the host and comprising:
the host receiving (PU(PK)) and (PK(BK)) from the peripheral, the host being a computing device communicatively coupled to the entity, the peripheral communicatively coupled to the host;
the host sending (PU(PK)) and (PK(BK)) to the entity, the entity comprising a computing device having encryption keys for encrypting and decrypting data;
the entity, having a private key (PR) corresponding to (PU), applying (PR) to (PU(PK)) to obtain (PK), applying (PK) to (PK(BK)) to obtain (BK), and sending (BK) back to the host;
the host receiving (BK) from the entity, selecting a content key (CK) for the content, encrypting (CK) according to (BK) to result in (BK(CK)), placing (BK(CK)) in a digital license, and transmitting the license including (BK(CK)) to the peripheral;
the peripheral applying (BK) to (BK(CK)) to obtain (CK), encrypting at least a portion of the content according to (CK), and transmitting the encrypted content to the host; and
the host receiving the encrypted content from the peripheral and applying (CK) to the encrypted content to decrypt same.

10. The method of claim 9 wherein the host has a public key (PU-H) and a private key (PR-H), the method comprising:
the host sending (PU(PK)) and (PU-H) to the entity, whereby the entity encrypts (BK) according to (PU-H) to result in (PU-H(BK)) and sends same back to the host; and
the host receiving (PU-H(BK)) and applying (PR-H) thereto to obtain (BK).

11. The method of claim 10 further comprising the host caching (BK) for later use.

12. The method of claim 11 comprising:
the host storing (BK) according to at least (PU(PK)) in a cache of the host;
the host again receiving (PU(PK)) from the peripheral; and
the host recognizing based on (PU(PK)) that (BK) is stored in the cache and retrieving (BK) from the cache based on such (PU(PK)).

13. The method of claim 9 comprising the host placing (BK(CK)) and at least one specified limitation in the license, whereby the peripheral is trusted to determine that each limitation in the license is satisfied before encrypting the content.

14. The method of claim 1 comprising the host placing (BK(CK)) and at least one specified right in the license, whereby the peripheral is trusted to determine that at least one right in the license allows the peripheral to encrypt the content.

15. The method of claim 1 comprising the host receiving (PU(PK)) from the peripheral in the form of a digital certificate.

16. The method of claim 7 comprising the host receiving (PU(PK)) from the peripheral in the form of a digital certificate that identifies with regard to the peripheral at least one of a type thereof, a manufacturer thereof, a model thereof, and capabilities thereof.

* * * * *